United States Patent [19]
Kennedy et al.

[11] Patent Number: 5,937,034
[45] Date of Patent: Aug. 10, 1999

[54] METHOD FOR TESTING CALL WAITING, CALLER ID FUNCTIONALITY OF TELEPHONE LINE

[75] Inventors: Michael Kennedy, Ventura; James Coleman, Malibu, both of Calif.

[73] Assignee: Harris Corporation, Melbourne, Fla.

[21] Appl. No.: 08/869,526

[22] Filed: Jun. 6, 1997

[51] Int. Cl.⁶ .............................. H04M 1/24; H04M 3/42
[52] U.S. Cl. ................................ 379/32; 379/1; 379/21; 379/215; 379/142
[58] Field of Search ................................. 379/1, 5, 6, 21, 379/27, 29, 28, 32, 34, 201, 215, 88.22, 88.24, 142

[56] References Cited

U.S. PATENT DOCUMENTS

| | | | |
|---|---|---|---|
| 4,764,949 | 8/1988 | Faith et al. | 379/27 |
| 4,777,645 | 10/1988 | Faith et al. | 379/21 |
| 5,649,002 | 7/1997 | Brady et al. | 379/215 |
| 5,699,418 | 12/1997 | Jones | 379/215 |
| 5,799,060 | 8/1998 | Kennedy et al. | 379/21 |
| 5,857,011 | 1/1999 | Kennedy et al. | 379/1 |

*Primary Examiner*—Paul Loomis
*Attorney, Agent, or Firm*—Charles E. Wands

[57] ABSTRACT

The control software of a central office-installed ringback test device is augmented to allow a craftsperson to test the operability of a caller identification, call-waiting (CIDCW) class of service of a line, without participation of another technician at the central office. Rather than instructing the craftsperson to go back in-hook, the SASS's microcontroller maintains the trunk circuit through which the incoming call is coupled to the SASS in a suspended, continuously monitored state, so as to effectively busy out the calling line. The SASS then places a return call to the calling number by way of the ringback line, which by-passes the trunk, to the central office switch. If the line circuit from which the call is being placed is equipped with CIDCW class of service, the incoming call from the SASS will exercise its functionality— including providing a ringing signal back to the SASS, and an indication to the calling technician of another call, including the originating telephone number of that call—but it will not return a busy tone to the SASS. If the SASS receives busy tone, it knows that the line of interest is not properly equipped with CIDCW class of service.

10 Claims, 1 Drawing Sheet

METHOD FOR TESTING CALL WAITING, CALLER ID FUNCTIONALITY OF TELEPHONE LINE

FIELD OF THE INVENTION

The present invention relates in general to communication systems, and to an augmentation of a ringback test device that is installable in a central office of a public switched telephone network (PSTN) and affords ringback testing of an accessing line. The invention is particularly directed to a modification of the control software employed by the ringback test device's microcontroller that allows a craftsperson to test the operability of a caller identification (caller ID), call-waiting (CIDCW) class of service of a line, without requiring the participation of another technician at the central office.

BACKGROUND OF THE INVENTION

In the course of testing for and troubleshooting potential fault conditions on a telephone circuit, it is often necessary for a craftsperson to conduct prescribed call establishment and/or call back routines. Although currently available automatic test equipment provides for a limited amount of testing, callback testing typically involves the participation of plural technicians, one of whom is located and places an initial call from a point-of-test remote relative to a central office (such as from a customer premises), and another of whom is typically located at the central office. This multiple participant requirement is especially paramount when testing more recently developed custom calling features, such as call waiting, call forwarding and caller ID for call waiting (deluxe call waiting).

In order to test the operability of these more sophisticated classes of service, such as deluxe call waiting, not only is it is necessary for the craftsperson to prove that multiple incoming and outgoing phone calls are being properly managed, but the technician must ascertain that the phone calls are properly delivered. Making this determination can be tedious and under fault conditions, test requirements are exacerbated by the fact that they may need to be performed repeatedly during the service call, as the technician localizes the cause of the fault. It is readily apparent therefore that, in order to keep pace with diverse products of a continually expanding industry, telephone system service personnel will have to employ automated systems.

One type of automated test device that has proven particularly useful is a telephone ringback test device, of the type described, for example, in the U.S. Pat. No. 4,764,949 issued Aug. 18, 1988 to Richard Faith, et al. (hereinafter referred to as the '949 patent), assigned to the assignee hereof, and the disclosure of which is incorporated herein. The ringback test device of the '949 patent, termed a single access service system (SASS), is designed to remedy the fact that a caller, such as a craftsperson working on the line with a butt-in test set, or a telephone equipment installer, for example, may not know the telephone number associated with the line from which the call to the central office facility is being placed.

The SASS effectively obviates this problem by analyzing prescribed AC and DC signaling characteristics of the calling party's line, when the technician calls into the SASS using a prescribed ringback access code. In response to this code, the SASS signals a specialized trunk (a toll trunk or an outgoing trunk) within the telephone central office, causing it to transmit a message that identifies the caller's telephone number. This number is then stored at the SASS and the technician is instructed to disconnect from the circuit (go back on-hook). Once the technician goes back on-hook, the SASS signals the central office switch, instructing the switch to dial the stored telephone number. If the caller's telephone rings, the ringback test is considered successful.

Now although the SASS is capable of performing ringback testing, as described above, it does not address the testing of recent caller identification-related additions to the CLASS feature set—most notably 'Caller Identification with Call Waiting' (CIDCW). CIDCW is defined in Bellcore document TA-NWT-000575 and may be summarized as follows. If a subscriber who is engaged in an active telephone call has the CIDCW feature enabled, and receives an additional incoming call, the subscriber will receive a subscriber-alerting-signal identical to the standard call-waiting tone. Following this initial alerting signal, the subscriber's phone set or other customer premises equipment (CPE) will receive a CPE Alerting Signal (CAS) from the central office switching equipment using the above-referenced Signaling System 7 (SS7) network. This CAS signal prepares the CPE device, such as a Caller ID desk top display unit or display telephone, to receive the Caller ID data associated with the second caller. If the CPE is working properly and ready to receive the Caller ID information, it will respond to the central office switching equipment with an acknowledgement signal, after which the switching equipment will transmit the Caller ID information in accordance with the industry standard format described in Bellcore document TA-NWT-000030.

As pointed out above, the SASS is operative to instruct the calling technician to disconnect from the circuit (go back on-hook), so that the SASS may signal the central office switch, to dial the stored telephone number. However, instructing the calling technician to go on-hook effectively defeats the purpose of testing CIDCW, since this class of service feature is exercised when the called party is already off-hook or busy. As a consequence, current procedures for testing CIDCW require an answering technician at the central office to keep his line off-hook, go to another phone and call back the calling technician, whose incoming line is busy by the mutual off-hook condition of the terminating ends of the original call placed to the central office test site. It will be readily appreciated, therefore, that there is a need for an improved automated ringback test scheme that allows exercising CIDCW class of service without requiring participation of additional telephone service personnel.

SUMMARY OF THE INVENTION

In accordance with the present invention, this objective is effectively achieved by a modification of the control software employed by the supervisory microcontroller of the above-referenced SASS, that allows a remote craftsperson accessing the SASS to test the operability of a caller identification (caller ID), call-waiting class of service of the line from which the craftsperson is calling, without requiring the participation of another technician at the central office.

Pursuant to the present invention, rather than instructing the craftsperson to hang up (go back on-hook), the SASS's microcontroller maintains the trunk circuit through which the incoming call is coupled to the SASS in a suspended, continuously monitored state, so as to effectively busy out the calling line. The SASS then places a return call to the calling number by way of a dedicated ringback line, which by-passes the suspended trunk circuit, from the SASS to the central office switch. If the line circuit from which the call has been placed to the SASS is equipped with CIDCW class of service, its incoming call from the SASS will exercise CIDCW functionality—including providing a ringing signal back to the SASS, which is passed on to the technician via a "ringing" voice prompt over the trunk circuit, and (audio/visual) indication to the remote technician of another call—but it will not return a busy tone to the SASS. If the SASS receives busy tone, however, it knows that the line of interest is not properly equipped with CIDCW class of service. This information is passed on to the technician via a "busy line" voice prompt over the trunk circuit.

BRIEF DESCRIPTION

Figure 1:
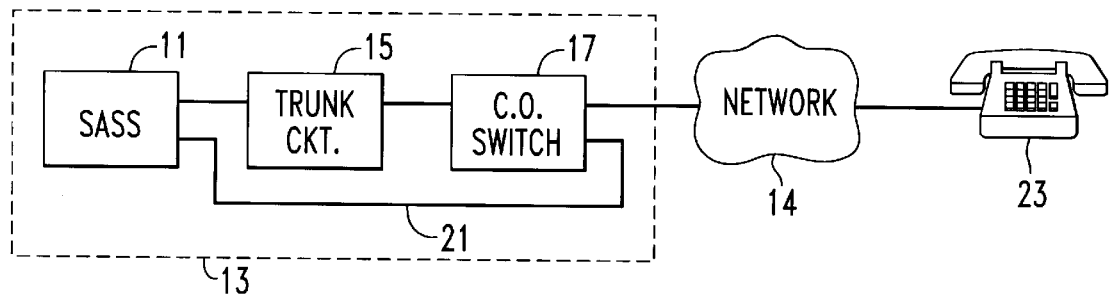
FIG. 1 diagrammatically illustrates a telephone ringback test device of the type described in the '949 patent.

Before describing in detail the method of testing the operability of a CIDCW class of service of a communication circuit in accordance with the present invention, it should be observed that the invention resides primarily in what is effectively a modification of the communication control routine that is resident in the supervisory control processor of a telephone facility test device, in particular the SASS detailed in the above-referenced '949 patent. As a consequence, the configuration of the circuits and components of such a central office-resident test system and the manner in which they are interfaced with other communication system equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustration and associated flow chart of the CIDCW test routine to be described are primarily intended to show the major components of the system in a convenient functional grouping and processing sequence, whereby the present invention may be more readily understood.

FIG. 1 diagrammatically illustrates a telephone ringback test device of the type described in the '949 patent, as comprising a single access service system (SASS) 11, which is installed in a telephone facility, such as a central office 13. Access to the SASS from the network 14 is provided by way of a trunk circuit 15, which is coupled to the central office switch 17. In addition to the trunk connection, the SASS 11 is also provided with a separate ringback line 21 to the C.O. switch 17, which is exclusive of or bypasses the trunk circuit 15.

As pointed out briefly above, and as is described in detail in the '949 patent, in normal operation, the SASS 11 is operative to remedy the fact that a caller, such as a craftsperson working on the line with a butt-in test set, for example, may not know the telephone number associated with the line from which the call to the central office facility is being placed. To remedy this shortcoming, the SASS 11 analyzes prescribed (AC and DC) signaling characteristics of a calling party's line, when a craftsperson calls into the SASS 11 from a subscriber circuit 23. In response to receipt of a ringback access code, the SASS 11 proceeds to signal the trunk circuit 15, to transmit the identity of the telephone number of the telephone circuit from which the incoming call to the SASS has been placed. This identified number is then stored in the SASS 11.

Next, the SASS generates a message instructing the technician to go back on-hook. The SASS 11 then signals the central office switch 17, via the dedicated ringback line 21, instructing the C.O. switch 17 to dial the stored telephone number. Unfortunately, this normal SASS operation of instructing the calling technician to go back on-hook effectively prevents testing a CIDCW class of service of the circuit from which the technician is calling, since the CIDCW class of service feature cannot be exercised unless the called party is currently off-hook or busy.

Figure 2:
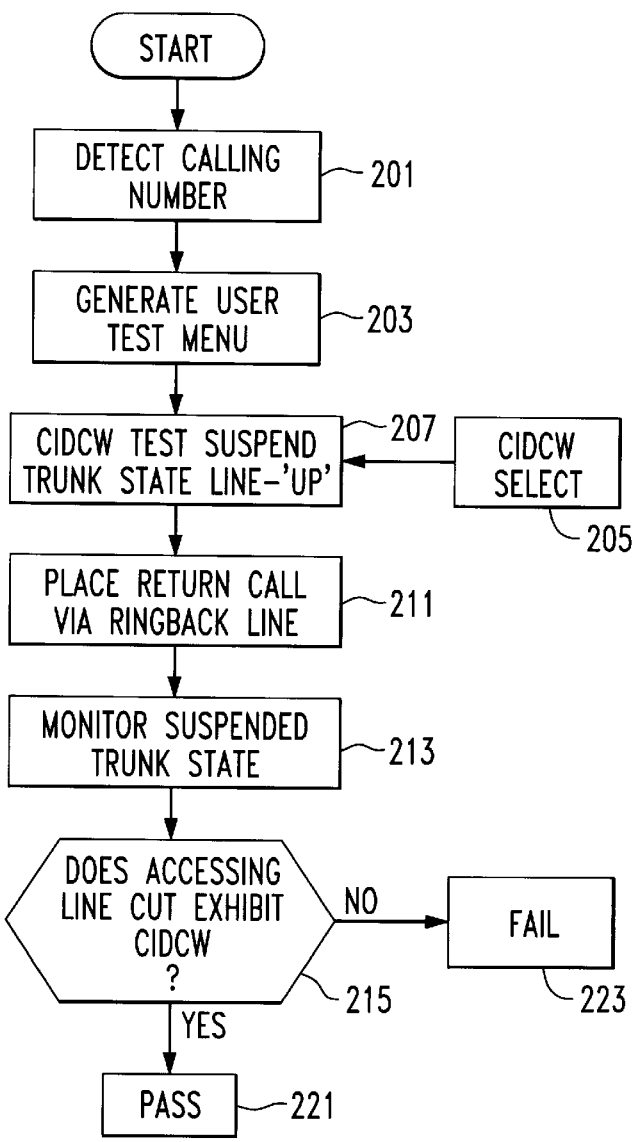
FIG. 2 is a flow chart of an augmentation of the supervisory control routine that is executable by the SASS of FIG. 1 to carry out the CIDCW test routine of the present invention.

Pursuant to the invention, the supervisory control routine that is executable by the SASS 11 is augmented to include a CIDCW test routine, shown in the flow chart of FIG. 2. As mentioned briefly above, and as will be described, this CIDCW test routine takes advantage of the separate ringback line 21 between the SASS 11 and the C.O. switch 17, so that with the trunk circuit 15 being maintained in a suspended mode that continues to busy out the incoming line from the calling circuit to the SASS 11, a return (CIDCW-exercising) call may be placed from the SASS to the 'busy' telephone circuit 23.

More particular, as shown in the flow chart of FIG. 2, at step 201, when the technician calls into the SASS using the SASS access code, as described above, the number of the calling circuit is detected. Next, in step 203, the SASS generates a menu of options selectable by the craftsperson. In accordance with the invention, the menu includes the option to test CIDCW class of service. Selecting this test option is indicated as a user response input 205 to step 207, in response to which the SASS suspends the current state of the trunk circuit 15, so as to effectively maintain incoming line in a continuously busy state. Next, in step 211, the SASS's test routine places a return call to the detected calling number by way of the ringback line 21 to the central office switch 17. Since the ringback line 21 bypasses the trunk circuit 15, the trunk circuit is unaffected by the return call signalling, and the state of the trunk circuit 15 can be maintained 'as is', keeping the calling line 'up' or busy. In the course of placing the return call through the ringback line 21, the SASS continues to monitor and maintain the suspended state of the trunk circuit 15, as shown at step 213.

In query step 215, if the line circuit 23 from which the call has been placed to the SASS is equipped with CIDCW class of service, the return call from the SASS via ringback line 21 in step 211 will exercise the CIDCW functionality of the line circuit 23—including providing a ringing signal back to the SASS, and (audio/visual) indication to the remote technician of another call—but it will not return a busy tone to the SASS. This constitutes a PASS of the CIDCW test, as shown at query step YES output 221. However, should it receive busy tone, the SASS knows that the subscriber circuit 23 is not properly equipped with CIDCW class of service, and the CIDCW test FAILS, as shown at query step NO output 223.

As will be appreciated from the foregoing description, the SASS augmentation control routine of the present invention successfully obviates shortcomings of current procedures for testing a CIDCW class of service of a telephone circuit, that would otherwise require an answering technician at the central office to keep his line off-hook, go to another phone and call back the calling technician. By making use of the ringback line between the SASS and the central office switch, the invention allows a remote craftsperson having no knowledge of the number of the line from which he is calling to access the SASS and test the operability of a CIDCW class of service of the calling line, and without requiring the participation of another technician at the central office. Because the ringback line bypasses the trunk circuit through which the calling line has accessed the SASS, the trunk circuit is unaffected by return call signalling, so that the state of the trunk circuit can be maintained 'as is', thereby keeping the calling line in the required busy state for a CIDCW testing.

While we have shown and described an embodiment in accordance with the present invention, it is to be understood that the same is not limited thereto but is susceptible to numerous changes and modifications as are known to a person skilled in the art, and we therefore do not wish to be limited to the details shown and described herein, but intend to cover all such changes and modifications as are obvious to one of ordinary skill in the art.

What is claimed:

1. A method of testing caller identification call waiting (CIDCW) class of service for a communication circuit installed in a telephone network, said method comprising the steps of:
   (a) from a communication unit coupled to said communication circuit, placing a first call to a telephone number assigned to a test device that is coupled through a trunk circuit to said telephone network;
   (b) at said test device, detecting a telephone number assigned to said communication circuit;
   (c) maintaining said trunk circuit in a suspended state, so as to effectively busy out said communication circuit; and
   (d) stimulating said call waiting class of service of said communication circuit by placing a second call from said test device to said telephone number assigned to said communication circuit.

2. A method according to claim 1, wherein said test device is coupled through a trunk circuit of a central office switch to said telephone network, and wherein step (d) comprises placing said second call via a path, exclusive of said trunk circuit, from said test device to central office switch.

3. A method according to claim 1, wherein said test device coupled is through a trunk circuit of a central office switch to said telephone network, and wherein step (d) comprises placing said second call via a ringback path from said test device, by-passing said trunk circuit, to central office switch.

4. A method according to claim 1, wherein said test device comprises a single access service system (SASS).

5. A method according to claim 1, wherein said caller's communication unit comprises a craftsperson's test set.

6. A control routine resident in the supervisory microcontroller of a test device of a telephone network facility, said test device being coupled through a trunk circuit to the telephone network, said control routine, when executed, testing caller identification call waiting (CIDCW) class of service of a communication circuit of said telephone network by performing the steps of:
   (a) in response to a first call being placed from a communication unit to a telephone number assigned to said test device, detecting the telephone number assigned to said communication circuit;
   (b) maintaining said trunk circuit in a suspended state, so as to effectively busy out said communication circuit; and
   (c) placing a second call from said test device to the telephone number assigned to said communication circuit, so as to stimulate said call waiting class of service of said communication circuit.

7. A control routine according to claim 6, wherein said test device is coupled through a trunk circuit of a central office switch to said telephone network, and wherein step (d) comprises placing said second call via a path that is exclusive of said trunk circuit from said test device to central office switch.

8. A control routine according to claim 6, wherein said test device is coupled through a trunk circuit of a central office switch to said telephone network, and wherein step (c) comprises placing said second call via a ringback path from said test device, by-passing said trunk circuit, to central office switch.

9. A control routine according to claim 6, wherein said test device comprises a single access service system (SASS).

10. A control routine according to claim 6, wherein said caller's communication unit comprises a craftsperson's test set.

* * * * *